April 9, 1940.  R. H. COWDERY ET AL  2,196,742
SEAMLESS FISHING ROD
Filed Aug. 2, 1934  2 Sheets-Sheet 1
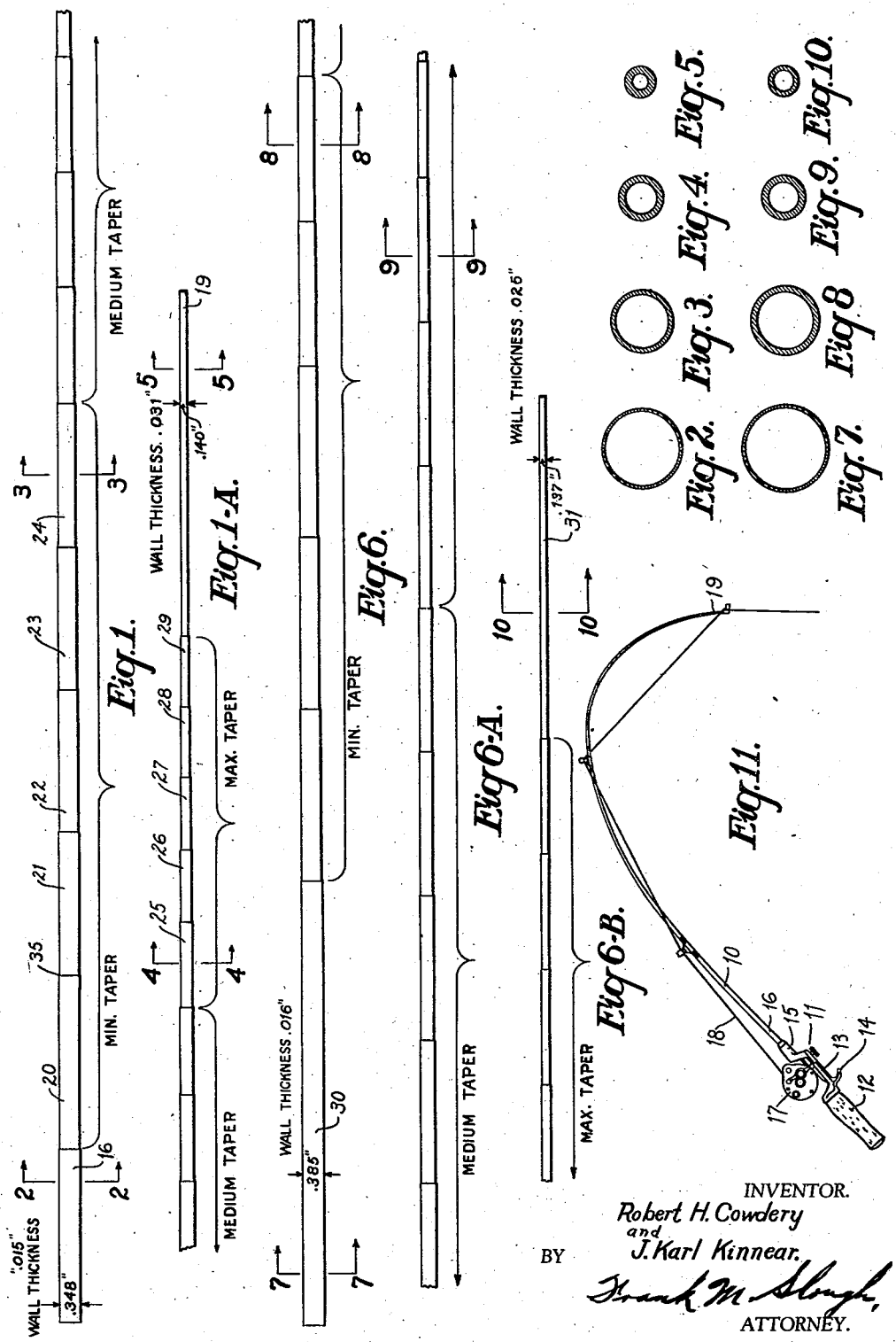
INVENTOR.
Robert H. Cowdery
and
J. Karl Kinnear.
BY
ATTORNEY.

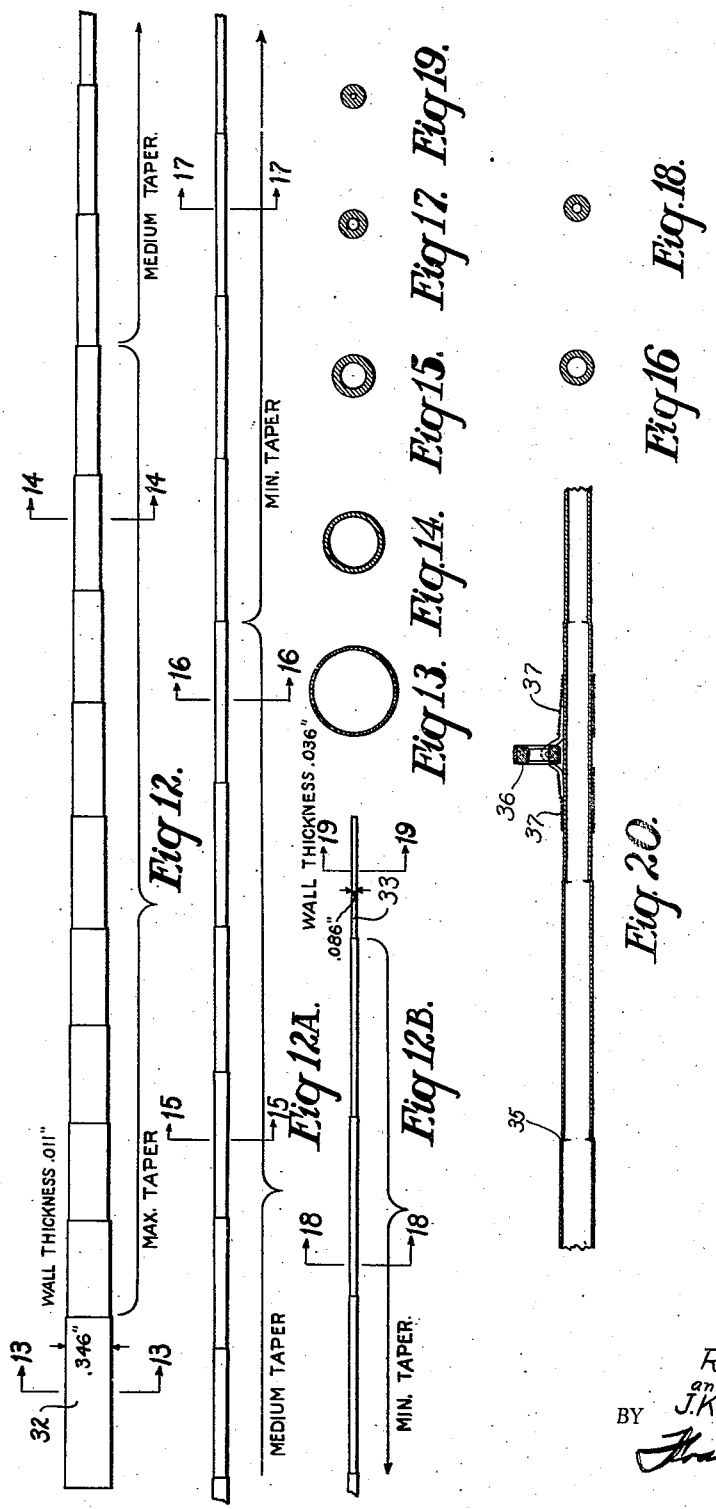

Patented Apr. 9, 1940

2,196,742

UNITED STATES PATENT OFFICE 2,196,742

SEAMLESS FISHING ROD

Robert H. Cowdery and J Karl Kinnear, Geneva, Ohio, assignors to The American Fork & Hoe Company, Cleveland, Ohio, a corporation of Ohio Application August 2, 1934, Serial No. 738,102

17 Claims. (Cl. 43—18)

This invention relates to metallic fishing rods, and relates more particularly to seamless tubular metallic fishing rods.

Heretofore metallic fishing rods have been of solid construction, or have been made of tubular sections, each section having a longitudinal seam, these seams being either open or brazed. Due to the seam constructions, these fishing rods have been unbalanced and too heavy at the rod tip.

It is an object of our invention, therefore, to provide a metallic seamless rod of the type referred to having a desired uniform balance.

Another object of our invention is to provide a tapered seamless tubular fishing rod having walls of varying thickness and wherein the flexibility may be controlled by correlating the taper and wall thickness.

Another object of our invention is to provide a metallic seamless fishing rod which is relatively flexible.

Another object of our invention is to provide a metallic seamless fishing rod which is relatively light in weight.

Another object of our invention is to provide a metallic seamless fishing rod of relatively great strength compared to its weight, and which may be handled with a minimum of effort and a maximum of accuracy when casting.

Another object of our invention is to provide a fishing rod of the type referred to, having a relatively strong and flexible tip portion adapted to take up jerks of the fish which would otherwise tend to loosen the hook.

Another object of our invention is to provide a rod of the type referred to which is relatively inexpensive to manufacture.

Another object of our invention is to provide a metallic tubular fishing rod of the type referred to, which is highly resistant to corrosive action occasioned by salt water and the like.

Other objects of the invention, and the invention itself, will become increasingly apparent from drawings, wherein:

Figures 1 and 1—A are fragmentary views, showing an integrally formed, seamless tubular rod embodying a preferred form of our invention, the rod being broken generally at the mid portion thereof.

Fig. 2 is a view taken along the lines 2—2 of Fig. 1;

Fig. 3 is a view taken along the lines 3—3 of Fig. 1;

Fig. 4 is a view taken along the lines 4—4 of Fig. 1—A;

Fig. 5 is a view taken along the lines 5—5 of Fig. 1—A;

Figs. 6, 6—A and 6—B are fragmentary views of successive portions of an integrally formed seamless tubular rod illustrating a modified form of our invention.

Figs. 7, 8, 9 and 10 are transverse sections taken along the lines 7—7, 8—8, 9—9 and 10—10 respectively of Figures 6, 6—A and 6—B;

Fig. 11 is a view showing the rod of Figures 1 and 1—A drawn to a smaller scale and illustrating a flexed position of the rod when in use;

Figs. 12, 12—A and 12—B are fragmentary views of successive portions of an integrally formed seamless rod, showing a still further modification of our invention.

Figs. 13, 14, 15, 16, 17, 18 and 19 are transverse sectional views taken respectively along the lines 13—13, 14—14, 15—15, 16—16, 17—17, 18—18 and 19—19 of Figures 12, 12—A and 12—B; and Fig. 20 is a fragmentary sectional view of a portion of the rod illustrated in Figure 11, showing the manner of securing a fish line guide to the rod.

The different figures of drawings are not relatively made to scale and generally speaking the cross-sectional views are according to an enlarged scale and the elevational views are usually reduced from actual size. However, the drawings show actual diametrical dimensions of the particular embodiment illustrated.

Referring now to the drawings and particularly Figures 1, 1—A and 11, we have indicated the rod generally at 10 and the rod handle at 11, said handle being of any desired construction and preferably provided with a socket at its forward end for receiving the butt end of the fishing rod which may be provided with a ferrule.

The rod illustrated in Figures 1 and 1—A is of seamless tubular construction and progressively reduced in diameter between the butt section 16 and the tip section 19 and in the embodiment illustrated this is effected by progressively reducing the diameter of the rod in sections progressively further removed from the butt section 16. As illustrated in Figures 1 and 1—A, the length of the sections is progressively decreased from the butt towards the tip end of the rod. It may be accomplished by progressively decreasing the section lengths in successive groups of sections proceeding toward the tip (thus section 15 and 20 etc.).

Thus, sections 16 and 20 may each be 3″ in length and the next four successive sections indicated at 21, 22, 23 and 24 may each be 2½″ in length, the next three successive sections beyond section 24 may be 2" in length, the next four sections 1½" in length, the next four sections 1¼" in length, these dimensions being for a rod 39" in over all length; for longer rods the linear dimensions would be correspondingly increased, the diametrical and wall thickness dimensions preferably remaining as illustrated and described. The tip section is of preferably greater length than any of the other sections and in the embodiment illustrated is shown as being 6" in length.

In the embodiment illustrated in Figs. 1 and 1A the wall thickness of the different sections is progressively increased proceeding from the butt section where the wall thickness is .015" to the tip section where the wall thickness is .031". It will be understood that between the butt section and the tip section the wall thicknesses are progressively varied in the direction of increased wall thickness.

The external diameter of each section may be chosen to effect the taper desired, the external diameter of butt section 16 and tip section 19 may be .348" and .075" respectively, the external diameter of the intermediate sections preferably being such that a minimum taper is effected at a portion of the rod including the butt section and comprising the first six sections, a medium taper being effected at an intermediate portion of the rod comprising the next six sections, and a maximum taper being effected at the outermost rod portion including the succeeding five sections. It is also to be noted that although the portion of the rod next adjacent the tip section is of maximum taper, the tip section itself is preferably tapered very slightly if at all and in the embodiment illustrated has little or no taper and being of maximum thickness approaches the characteristics of a solid rod in said tip section. It will be understood that these dimensions are merely illustrative and for rods of different lengths will be correspondingly varied.

The successive decreases in the external diameters and the corresponding increases in wall thicknesses at various portions of the rod as the tip end is approached, is clearly indicated in the cross-sectional enlarged views of Figures 2 to 5 inclusive, and it will be observed from reference to Figure 5, that the combined wall thickness of the tip portion is substantially the diameter of the tip bore, thus providing a relatively strong and flexible tip portion, which approaches the characteristics of a solid rod. By thus relating the wall thickness and the external taper in various portions of the rod, the rod may be so designed as to most efficiently distribute the strength, weight, and flexibility for the purposes desired.

The rod of the present invention is preferably formed of drawn and tempered steel and the tapering thereof may be effected in any desired way, although we preferably employ the method outlined in a patent to Robert H. Cowdery, No. 1,963,048, issued June 12, 1934, for a Method of drawing tubes.

As indicated in Figure 20, line guides 36 are secured to the rod in any suitable manner as by encircling the guide support with silk winding as indicated at 37.

The rod described has considerable flexibility at the outermost portion of the rod, consistent with adequate strength and is relatively stiff as the butt end of the rod is approached, as clearly indicated by Figure 11 which shows substantially the flexed position the rod of Figures 1 and 1—A assumes when in use. Such a construction effects projection of the bait or fly with minimum of effort and maximum of accuracy, permitting greater ease of cast and less difficulty in fishing operation than is encountered in bamboo rods and brazed tubular rods. Also, due to the uniformity of structure and the greater flexibility of the rod, sudden movements of the fish which usually tend to loosen the hook are counteracted and fewer strikes are lost than when employing any of the aforementioned rods.

Referring now to Figures 6, 6—A, 6—B and 7 to 10 inclusive, we have illustrated a similar rod of modified form dimensions particularly adapted for use as a salmon fly rod, although not limited thereto. This rod is provided with a relatively long butt section indicated at 30, the succeeding sections progressively decreasing in external diameter and generally decreasing in section lengths, and the walls progressively thickening as the tip end of the rod is approached. The progressive reduction in external diameter and increase in wall thickness at successively increasing distances from the butt end of the rod is clearly indicated in Figures 7 to 10 inclusive. The external diameter of the butt section 30 of the rod may be .385" with a wall thickness of .016" and the tip section 31 which may be the length such as 6", may have an external diameter of .137" and a wall thickness of .025". This rod adapted as a salmon fly rod will be relatively longer than the casting rod of Figures 1 and 1—A and the taper generally will be less, the average rate of taper of the casting rod being preferably approximately .08" per foot and the salmon fly rod preferably approximately .06" per foot.

The rate of taper at different portions of the rod may vary somewhat with the rod portion including the butt section 30, preferably having a slightly less taper than the intermediate rod portion and the outermost portion of the rod, including the tip section 31, having a slightly greater taper generally with the tip portion of the rod being the least tapered of the outermost portion.

Figures 12, 12—A, 12—B and 13 to 19 inclusive illustrate a still further modified form of rod. In this modification the rate of taper is preferably more rapid in the portion of the rod including the butt section 32 than in an intermediate rod portion and the outermost portion of the rod, including the tip portion, has a slightly less rate of taper than the intermediate rod portion, the rate of taper throughout being approximately .06" per foot. It will be noted, therefore, that the rate of taper proceeding from the butt to the tip section in the rod of this embodiment is progressively decreased as distinguished from the embodiments previously described and is therefore of elongated conoidal formation, having a decreasing or arcuate taper in the major portion of the rod particularly that intervening between the butt and tip sections, reference being to external dimensions. The tip section may be as illustrated relatively short or may be made relatively longer as in the foregoing embodiments and may be in some cases gradually tapered toward its tip end. In the embodiment illustrated the outside diameter of the butt section 32 may be .346 with a wall thickness of .011, the rod progressively decreasing in outside diameter and increasing in wall thickness as the tip is approached with the tip section, indicated at 33, having an outside diameter of .086" and a wall thickness of .036".

The above described rod preferably has the successive sections proceeding from the butt end, generally increasing in length as the tip end of the rod is approached, in contrast to the rods previously described, wherein the section lengths generally decrease as the tip end of the rod is approached. In all three rods it will be noted that the tip portion, due to the small diameter bore and relative thickness of the walls, approaches a solid rod in construction and function, these characteristics being most pronounced in the rod illustrated in Figures 12 and 12—A. By reference to Figure 5, it will be seen that the tip portion of the first rod described has its inside diameter approximately equaling the combined thickness of the tip portion walls and that the tip portion of the rod of Figures 12 and 12—A has a relatively small bore diameter which is less than the thickness of the tip portion wall as shown in Fig. 19. The aforementioned construction at the tip portion of the rod provides a relatively strong tip, offering considerable resistance to any tendency to buckle inwardly, but at the same time is of considerable flexibility.

All the rods may be formed by a tube drawing process, such as the Cowdery process previously mentioned, to provide strong, flexible and uniformly balanced rods, economically manufactured.

We have indicated the preferred relative taper at various portions of the rods shown, but it is understood that the taper and wall thickness may be varied to effect varied effects of strength and flexibility when in use.

Although we have shown and described modifications of our invention, we contemplate that numerous and extensive departures may be made therefrom, without departing from the spirit of our invention and the scope of the appended claims.

In Figure 20 a longitudinal sectional view of a rod embodying the principles of my invention illustrates the stepped tubular formation providing an effective taper and illustrating the shoulders 35 intermediate the adjacent sections and also the manner in which a line guide 36 is secured by a wrapping 37 to the rod as is the common practice at intervals throughout the length of the rod. Although the embodiments herein illustrated and described are illustrated as being of stepped tubular formation it will be understood that this is merely a preferred form and that a smooth tapered construction may be adopted having the same general dimensions as to taper, wall thickness and characteristic functions and that my invention broadly construed is to be considered as including the smooth tapered form of rod as well as the step tapered form.

Having thus described our invention in different embodiments, we are aware that numerous other embodiments of our invention may be made and as comprehended within the appended claims.

Reference may also be had to our co-pending application, Serial No. 738,830, filed August 7, 1934, for "improvement in Jointed seamless fishing rods."

We claim:

1. A light and flexible metallic fishing rod of seamless drawn tubular formation of progressively reduced diameter proceeding from butt toward the tip, the walls thereof being progressively thickened proceeding toward the tip, the wall thickness at the tip region being so increased, and the outside diametrical dimensions of the rod at such region being so decreased as to give to the tip region of the tubular rod substantially the functional characteristics of a solid rod in resisting a tendency to buckle inwardly.

2. A light and flexible metallic fishing rod of seamless drawn tubular formation having substantially uniform taper from end to end and having approximately the strength of a solid rod in its tip region, the rod walls being annular in cross section and homogeneous at every point about its axis whereby there is provided an even resistance to bending in every radial plane at every point in its length, the outside diameter of the rod being greatest at or near the butt end and being progressively decreased proceeding toward the tip end, the rod bore being progressively decreased in diameter proceeding inwardly toward the tip end but at a more rapid rate than the outside surface whereby the thickness of the walls is progressively increased toward the tip end of the rod to reduce the bore at said tip end to such dimensions relative to the thickened walls thereat as to give the tip region the functional characteristics of a solid rod in resisting the tendency to buckle inwardly.

3. A light and flexible metallic fishing rod of seamless drawn tubular formation of progressively reduced diameter proceeding from butt toward the tip the walls thereof being progressively thickened proceeding toward the tip, the wall thickness at the tip region being so increased, and the outside diametrical dimensions of the rod at such region being so decreased as to give to the tip region of the tubular rod substantially the functional characteristics of a solid rod in resisting a tendency to buckle inwardly, the rod bore at the tip region being not more than twice the diametrical extent of the combined thicknesses of opposite walls thereof.

4. A light and flexible metallic fishing rod of seamless drawn tubular formation having a substantially uniform taper from end to end and having approximately the strength of a solid rod in its tip region, the rod walls being annular in cross section and homogeneous at every point about its axis whereby there is provided an even resistance to bending in every radial plane at every point in its length, the outside diameter of the rod being greatest at or near the butt end and being progressively decreased proceeding toward the tip end, the rod bore being progressively decreased in diameter proceeding inwardly toward the tip end but at a more rapid rate than the outside surface whereby the thickness of the walls is progressively increased toward the tip end of the rod to reduce the bore at said tip end to such dimensions relative to the thickened walls thereat as to give the tip region the functional characteristics of a solid rod in resisting the tendency to buckle inwardly, the rod bore at the tip region being not more than twice the diametrical extent of the combined thicknesses of opposite walls.

5. A light and flexible metallic fishing rod of seamless drawn tubular formation of progressively reduced diameter proceeding from butt toward the tip, the walls thereof being progressively thickened proceeding toward the tip, the wall thickness at the tip region being so increased, and the outside diametrical dimensions of the rod at such region being so decreased as to give to the tip region of the tubular rod substantially the functional characteristics of a solid rod in resisting a tendency to buckle inwardly, the rod bore at the tip region being not greater than the combined thicknesses of opposite walls thereof.

6. A light and flexible metallic fishing rod of seamless drawn tubular formation having substantially uniform taper from end to end and having approximately the strength of a solid rod in its tip region, the rod walls being annular in cross section and homogeneous at every point about its axis whereby there is provided an even resistance to bending in every radial plane at every point in its length, the outside diameter of the rod being greatest at or near the butt end and being progressively decreased proceeding toward the tip end, the rod bore being progressively decreased in diameter proceeding inwardly toward the tip end but at a more rapid rate than the outside surface whereby the thickness of the walls is progressively increased toward the tip end of the rod to reduce the bore at said tip end to such dimensions relative to the thickened walls thereat as to give the tip region the functional characteristics of a solid rod in resisting the tendency to buckle inwardly, the rod bore at the tip region being not greater than the combined thicknesses of opposite walls thereof.

7. A light and flexible tubular metallic fishing rod of seamless drawn tubular formation and progressively reduced in diameter proceeding from the butt toward the tip, the rate of diametrical reduction being progressively decreased as the tip end of the rod is approached, the average reduction in the outside diameter of the rod being approximately at the rate of .06" per foot.

8. A light and flexible tubular metallic fishing rod tapered from butt toward the tip and having the walls progressively thickening toward the tip, the wall thickness at the tip region being greater than one third the diameter of the adjacent bore, giving to the tip region of the tubular rod the functional characteristics of a solid rod.

9. A tubular exteriorly tapered metallic fishing rod characterized by the fact that the ratio of exterior tapering differs in different portions of the rod.

10. A drawn tubular tapered metallic fishing rod characterized by the fact that the ratio of tapering differs in different portions of the rod.

11. A tubular exteriorly tapered metallic fishing rod characterized by the fact that the bore of the rod is tapered from the butt toward the tip in greater degree than the exterior, with a resulting increase in wall thickness toward the tip region.

12. A tubular exteriorly tapered metallic fishing rod characterized by the fact that the ratio of exterior tapering differs in different portions of the rod, the ratio of tapering being at a minimum toward the butt end of the rod, and at a medium ratio in the intermediate portion of the rod, and at a maximum in the portion terminating at the tip end of the rod.

13. A tubular exteriorly tapered metallic fishing rod characterized by the fact that the ratio of exterior tapering differs in different portions of the rod, and wherein the wall thickness increases from the butt end of the rod toward the tip end thereof.

14. A tubular exteriorly tapered metallic fishing rod characterized by the fact that the ratio of exterior tapering differs in different portions of the rod, the ratio of exterior tapering being less in the region toward the butt end of the rod and greater in the region toward the tip end of the rod, and wherein the wall thickness is progressively varied from the butt end of the rod toward the tip end thereof.

15. A flexible metallic fishing rod of tapering tubular construction having the walls progressively thickening and the diameter progressively decreasing toward the tip, and the diameter of the bore in the tip region being less than the combined thickness of the walls, giving to the tip region the functional characteristics of a solid rod in resisting a tendency to buckle inwardly.

16. A flexible metallic fishing rod of drawn circular seamless tubing of tapering construction having the walls progressively thickening and the diameter progressively decreasing toward the tip, and the diameter of the bore in the tip region being less than the combined thickness of the walls, giving to the tip region the functional characteristics of a solid rod in resisting a tendency to buckle inwardly.

17. A flexible metallic fishing rod of drawn seamless tubing of tapering construction having the walls progressively thickening and the diameter progressively decreasing toward the tip, and having the bore of the tip portion reduced to less than the combined wall thickness of the tip portion, giving to the tip region the functional characteristics of a solid rod.

ROBERT H. COWDERY.
J KARL KINNEAR.